F. TREXEL.
CAR BRAKE.
APPLICATION FILED MAY 21, 1910.
968,292.
Patented Aug. 23, 1910.
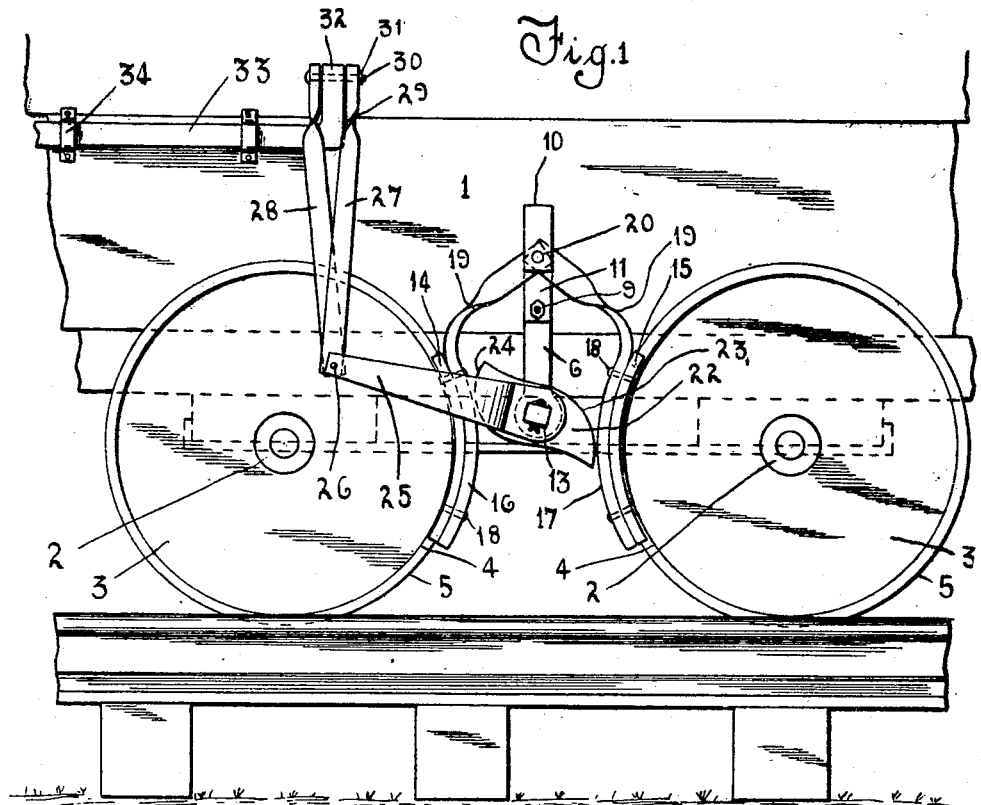
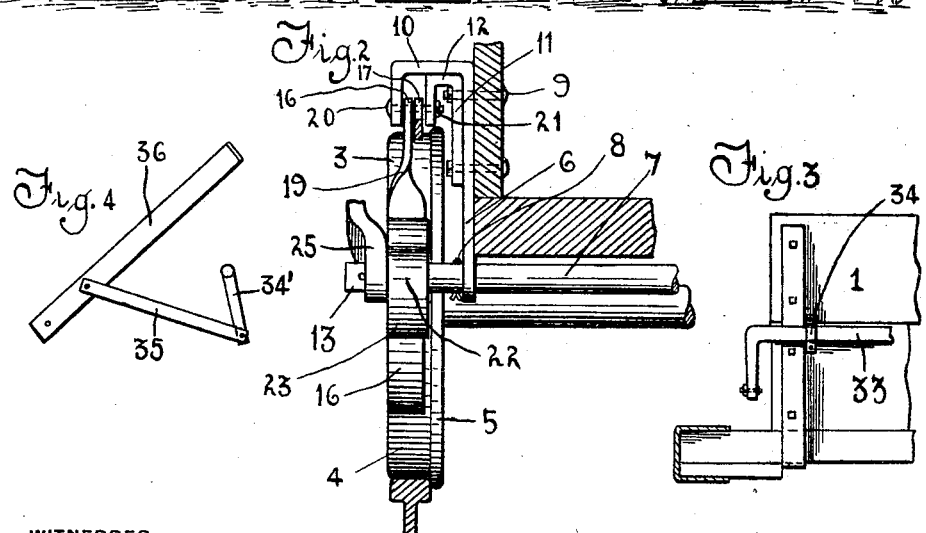
WITNESSES
INVENTOR
F. TREXEL
By Attorneys

UNITED STATES PATENT OFFICE.

FOREST TREXEL, OF JOHNSTOWN, PENNSYLVANIA, ASSIGNOR OF ONE-HALF TO SUNNY-SIDE COAL COMPANY, OF JOHNSTOWN, PENNSYLVANIA, A CORPORATION OF PENNSYLVANIA.

CAR-BRAKE.

968,292.   Specification of Letters Patent.   Patented Aug. 23, 1910.

Application filed May 21, 1910. Serial No. 562,707.

*To all whom it may concern:*

Be it known that I, FOREST TREXEL, a citizen of the United States of America, residing at Johnstown, in the county of Cambria and State of Pennsylvania, have invented certain new and useful Improvements in Car-Brakes, of which the following is a specification, reference being had therein to the accompanying drawing.

This invention relates to car brakes particularly adapted for use in connection with pit cars and one of the objects thereof is to provide a manually-operated brake in a manner as hereinafter set forth and having as elements thereof brake shoes which are renewable at small expense and easily attached and detached when occasion so requires.

A further object of the invention is to provide a car brake for pit cars having as elements thereof pairs of brake shoes, each pair interposed between a pair of wheels and adapted when operated to apply equal pressure to the wheels thereby obtaining a uniform braking action upon both wheels simultaneously.

A further object of the invention is to provide a car brake in a manner as hereinafter set forth and having as elements thereof two pairs of brake shoes having a common operating means therefor capable of being operated from either side of the car.

Although the invention is designed primarily for use in connection with pit cars, yet it is to be understood that the form of brake can be used for braking purposes wherein it is found applicable.

Further objects of the invention are to provide a car brake which shall be comparatively simple in its construction and arrangement, strong, durable, efficient in its use, conveniently operated, comparatively inexpensive to manufacture and readily set up with respect to a pair of car wheels.

With the foregoing and other objects in view, the invention consists of the novel construction, combination and arrangement of parts as hereinafter more specifically described and illustrated in the accompanying drawings wherein is shown the preferred embodiment of the invention but it is to be understood that changes, variations and modifications can be resorted to which come within the scope of the claims hereunto appended.

In the drawings wherein like reference characters denote corresponding parts throughout the several views: Figure 1 is a side elevation of a portion of a pit car showing the adaptation therewith of a car brake in accordance with this invention, the brake lever being broken away. Fig. 2 is an end sectional elevation broken away. Fig. 3 is a side elevation broken away of the brake lever, and, Fig. 4 is an end view of the brake lever and further illustrating the actuating means therefor.

A car brake in accordance with this invention comprises two pairs of brake shoes, a pair of hangers for each pair of brake shoes and a support for each pair of hangers. The support and a pair of hangers are positioned at each side of the car. The drawing illustrates one side of the car showing one support, one pair of hangers and one pair of brake shoes but it is to be understood that on the other side of the car and directly opposite the support, hangers and brake shoes are arranged another support, pair of hangers and pair of brake shoes. The description of the support, hangers and brake shoes on one side of the car will apply to the support, hangers and brake shoes upon the other side of the car.

1 denotes the body of a car having connected thereto a pair of axles 2 each having each of its ends provided with a wheel 3 formed with a tread 4 and flange 5. Arranged centrally of the body of the car and interposed between the axles 2 and supported by the supports 6 (only one shown) is a rock shaft 7 having its transverse movement with respect to the body of the car arrested by the cotter pins 8 (only one shown) which engage the supports 6. Each of the supports 6 is fixedly secured in position to the sides of the car body 1 by the hold-fast devices 9 and each of said hangers 6 at its upper end terminates in a laterally-projecting angle-shaped extension 10 arranged against the outer face of each of the supports 6 and secured to its respective support by the hold-fast devices 9 is a bar 11 having its upper end provided with a laterally-projecting angle-shaped extension 12, the vertical arm of the extension 12 opposing the vertical arm of the extension 10 as well as being spaced therefrom. The rock shaft 7 is of a length as to have each of its ends project beyond the extension 10 of the supports 6 and each of the projecting ends (only one shown) is squared as at 13.

The shoes of each pair of brake shoes are indicated by the reference characters 14, 15 and each is segment-shaped in contour and adapted to engage the tread of the wheel 3. The brake shoes 14, 15 are suspended by the shiftable and resilient hangers 16, 17 respectively and each brake shoe is detachably-secured by the hold-fast devices 18 to its respective hanger, that portion of the hanger to which the brake shoe is secured being segment-shaped in contour. The upper portion of the hanger 16 as well as the upper portion of the hanger 17 is torsionally-twisted as at 19 and mounted upon a bolt 20 positioned in the vertical arms of the extensions 10, 12 and maintained in position by the nut 21. The projecting ends of the shaft 7 are interposed between the hangers 16 and 17 and upon each of said projecting ends is fixedly secured a brake block 22 (only one shown) having each side thereof curved as at 23, 24 and with the curved side 23 reversely disposed with respect to the curved side 24. The curved side 23 is adapted to engage the hanger 17 and the curved side 24 the hangers 16 when the rock shaft 7 is shifted in one direction, whereby the hangers will be forced away from each other and the brake shoes moved to engage the treads of the wheels to perform their braking function.

Fixedly secured to one of the squared ends 13 of the shaft 7 is an off-set crank 25 having its free end pivoted as at 26 to a pair of upwardly-extending links 27, 28 which are torsionally twisted at their upper portions as at 29 and pivotally-connected by the bolt 30 and nut 31 to the angular inner end 32 of a brake lever 33 which extends in parallelism with respect to the side of the car body 1 and is shiftably-mounted in keepers 34 fixedly secured to the side of the car body 1. The forward end of the brake lever 33 is provided with a crank 34' connected by a link 35 to an actuating arm 36 which is adapted to be pivoted to the front of the car body.

When the arm 36 is shifted toward the longitudinal center of the car body, the link 35 is carried therewith and the brake lever 33 shifted in the keepers 34 in a direction so that the angular inner end 32 thereof will be moved away from the side of the car body, such movement of the angular inner end 32 of the lever 33 moving the links 27 and 28 forwardly. These latter carry the crank 25 therewith and rock shaft 7 in one direction whereby the block 22 will be moved to engagement with the hangers 16 and 17 and the brake shoes 14, 15 shifted to engage the treads of the wheel 2 to perform their braking function. When the shaft 7 is rocked, both blocks 22 are shifted whereby both pairs of brake shoes will simultaneously perform their braking function and an equal pressure will be had against both sets of wheels.

What I claim is:

1. A car brake comprising a rock shaft, a brake block mounted upon each end thereof, a pair of brake shoes, hangers carrying said brake shoes and adapted when shifted away from each other to force the shoes against the treads of the wheels, a crank arm for shifting said shaft whereby said blocks will be moved to engage the hangers forcing them apart, a brake lever having an angular inner end, and connections between the crank and the angular inner end of said lever.

2. A car brake comprising a rock shaft, torsionally-twisted brake shoe hangers, a support therefor, a brake shoe carried by each of said hangers and adapted when its respective hanger is shifted to perform its braking function, brake blocks carried by the rock shaft and interposed between each pair of hangers and adapted when actuated in one direction to shift the hangers, an off-set crank arm connected to the rock shaft, a shiftable brake lever having an angular inner end, and connections between the crank arm and the angular inner end of the lever for actuating the arm to operate the rock shaft when the lever is shifted.

3. A car brake comprising two pairs of torsionally-twisted shiftable brake shoe hangers, a brake shoe carried by the hangers of each pair and adapted when its respective hanger is shifted in one direction to perform a braking function, actuating means interposed between and for the hangers of each pair, an off-set crank arm connected with said actuating means, and means operatively-connected with said crank arm for shifting it whereby the actuating means is operated.

4. A car brake comprising two pairs of torsionally-twisted shiftable brake shoe hangers, a brake shoe carried by the hangers of each pair and adapted when its respective hanger is shifted in one direction to perform a braking function, actuating means interposed between and for the hangers of each pair, an off-set crank arm connected with said actuating means for shifting it whereby the actuating means is operated, a shiftable brake lever having an angular inner end, and connections between the angular inner end of the brake lever and the off-set crank arm for shifting it when the brake lever is operated thereby operating said actuating means.

5. A car brake comprising two pairs of shiftable brake shoe hangers, a braking shoe carried by each of the hangers of each pair and adapted when its respective hanger is shifted to perform a braking function, actuating means having interposed between each pair of hangers a common supporting means for said actuating means and said hangers, a shiftable brake lever having an angular inner end, and operative connections between the angular inner end of the brake lever and said actuating means.

6. A car brake comprising two pairs of shiftable and resilient brake shoe hangers, a brake shoe connected to each of the hangers of each pair and adapted when its respective hanger is shifted in one direction to perform a braking function, a brake block interposed between the hangers of each pair and adapted when actuated in one direction to simultaneously shift the hangers, a shiftable support for said brake blocks, an offset crank arm connected to said support, and means connected with the crank arm for shifting it.

7. A car brake comprising two pairs of shiftable and resilient brake shoe hangers, a brake shoe connected to each of the hangers of each pair and adapted when its respective hanger is shifted in one direction to perform a braking function, a brake block interposed between the hangers of each pair and adapted when actuated in one direction to simultaneously shift the hangers, a shiftable support for said brake blocks, an offset crank arm connected to said support, a shiftable brake lever having an angular inner end, and upright links connected to said crank arm and having their upper portions torsionally-twisted and attached to the angular inner end of the brake lever.

In testimony whereof I affix my signature in the presence of two witnesses.

FOREST TREXEL.

Witnesses:
H. A. LING,
HARRY C. LIEBER.